United States Patent [19]

Lacroix

[11] 4,374,549
[45] Feb. 22, 1983

[54] DRIVE UNIT FOR A TWO-WHEELED MOTOR-DRIVEN VEHICLE AND VEHICLE INCLUDING SAID UNIT

[75] Inventor: Bernard Lacroix, Montbeliard, France

[73] Assignee: Cycles Peugeot, Valentigney, France

[21] Appl. No.: 287,848

[22] Filed: Jul. 29, 1981

[30] Foreign Application Priority Data

Aug. 4, 1980 [FR] France .............................. 80 17160

[51] Int. Cl.³ ...................... B62M 7/04; B62K 25/04
[52] U.S. Cl. .................................. 180/207; 180/205; 180/227
[58] Field of Search ............... 180/207, 205, 206, 219, 180/227, 230, 231

[56] References Cited

U.S. PATENT DOCUMENTS

| 4,091,887 | 5/1978 | Kutata et al. | 180/230 |
| 4,140,195 | 2/1979 | Watanabe et al. | 180/205 |
| 4,169,512 | 10/1979 | Ishikawa et al. | 180/205 |

FOREIGN PATENT DOCUMENTS 861764  2/1961  United Kingdom ............... 180/205

Primary Examiner—Joseph F. Peters, Jr.
Assistant Examiner—Donn McGiehan
Attorney, Agent, or Firm—Sughrue, Mion, Zinn, Macpeak and Seas

[57] ABSTRACT

The drive unit comprises mainly a motor-gearing down relay assembly (M, R) whose single case (1, 2) carries suspension arms (3, 4) which rearwardly extend the assembly and support the driving wheel of the vehicle and a suspension system such as springs (19).

8 Claims, 8 Drawing Figures

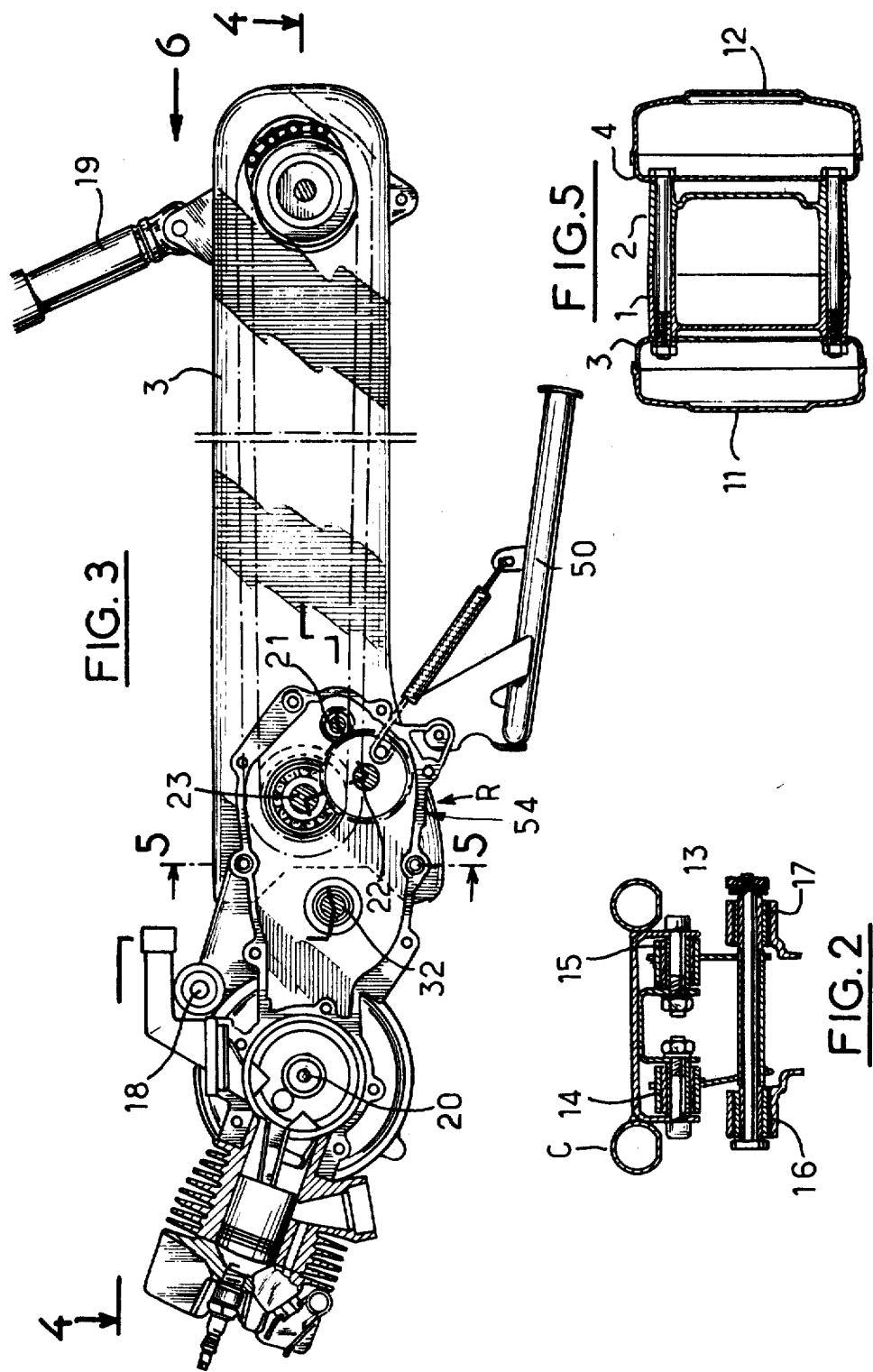

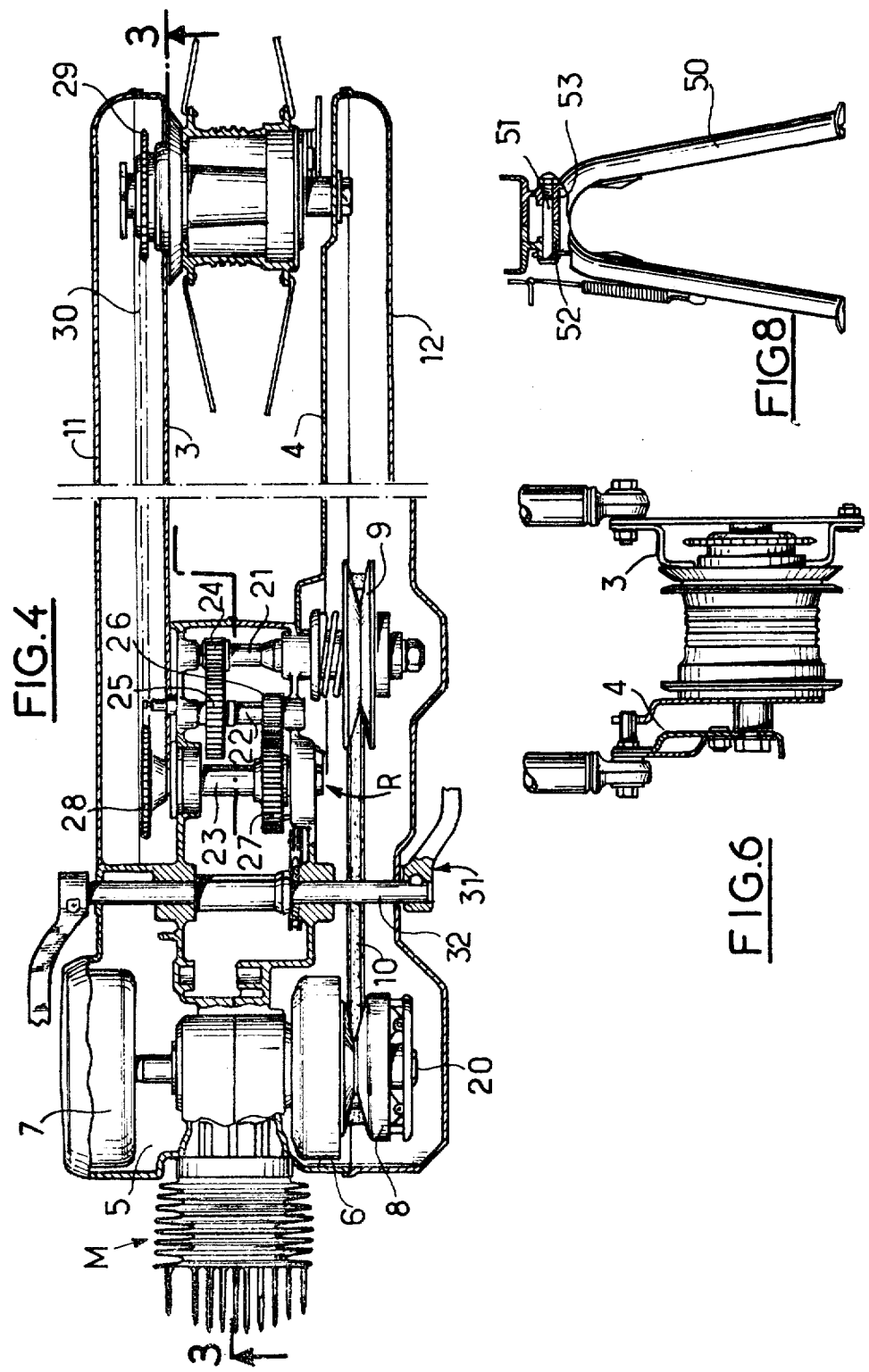

DRIVE UNIT FOR A TWO-WHEELED MOTOR-DRIVEN VEHICLE AND VEHICLE INCLUDING SAID UNIT

The present invention relates to two-wheeled motor-driven vehicles and more particularly drive units for said vehicles.

A two-wheeled motor-driven vehicle of conventional design comprises a motor fixed under the frame of the vehicle and a transmission comprising a belt and pulley device which may constitute a speed variator, in series with a chain transmission constituting a gearing down stage. The rear wheel may, moreover, be driven by a pedal crank gear shaft through a chain and two sprockets with interposition of a free wheel. In this arrangement, a suspension rocker is provided and pivotally mounted in the front part thereof under the frame of the vehicle. This rocker supports in the median part thereof, an intermediate shaft on which there are mounted the driven pulley, a sprocket of the chain transmission and the pedal crank gear, and, at the rear end thereof, the rear wheel and the suspension springs.

A drawback of such an arrangement is that it permits the use of only a limited gearing down ratio and a possible variation in the distance between the axes of the crankshaft of the motor and the intermediate shaft when the rear wheel moves up and down.

In another arrangement, the driven pulley of the belt transmission is located in the vicinity of the axis of the rear wheel and drives the latter through a gearing down device which is also located in the region of the rear wheel. The vehicle is driven by the crank gear in a simple manner through a separate chain transmission.

With such an arragement, the rear wheel is particularly complicated to dismantle. There is moreover the aforementioned drawback of the variations in the distance between the axes of the crankshaft and certain elements of the transmission which might result in variations in the running speed of the motor and produce additional fatigue of the transmission.

It has already been proposed (French Pat. No. 2 353 432) to mount the gearing down device and the axle of the rear wheel on the arms of a rear fork connected to the motor and forming with the latter a unit, but the dismantling of the rear wheel remains complicated and the variations in the distance between the axes are not avoided.

There may also be mentioned two-wheeled motor-driven vehicles which do not include pedals and in which a conventional drive unit comprising the motor and a gear box drives the rear wheel through a chain transmission.

The objects of the present invention are several. It is desired to provide a drive unit which, while it is of simple construction, provides a high gearing down ratio. The distance between the axes of the various elements of the transmission must also be maintained fixed when the rear wheel moves up and down under the effect of the unevenness of the ground. The unit must moreover be easily adaptable to different types of vehicles and allow both the drive unit itself and the rear wheel to be dismantled.

The invention provides a drive unit comprising a motor unit including two suspension arms adapted to receive, in the vicinity of the free ends thereof, the driving wheel of the vehicle and support means which are elastically yieldable and/or shock absorbing, for the suspended part of the vehicle, characterized in that it comprises a unit comprising a motor and a gearing down relay in which an input shaft of the relay, which is driven by the crankshaft of the motor, is spaced a greater distance away from the crankshaft than the output shaft of said relay and, a pedal crank gear having a shaft disposed in the unit between the motor and the relay and adapted to drive the output shaft with interposition of a free-wheel or other unidirectional coupling.

According to other features of the invention:

The gearing down relay comprises an input shaft driven by the motor through a belt and pulley transmission, an intermediate shaft, and an output shaft which drives the driving wheel through a chain transmission.

The output shaft may also be driven by a pedal crank gear shaft incorporated in the unit comprising the motor and the relay.

The suspension arms are detachably fixed to the case of the motor unit-gearing down relay.

The gearing down relay and the rear region are independent and spaced apart and the relay may be easily so constructed as to provide the desired gear ratio while neither the variations in the position of the wheel nor the up and down movements thereof have any effect on the distance between the axes of the crankshaft and the shaft of the relay which thus remains constant.

Another object of the invention is to provide a two-wheeled motor-driven vehicle provided with such a drive unit, the latter being, in the known manner, mounted to pivot about a transverse axis under the frame of the vehicle and supporting this frame in the rear part thereof through elastically yieldable and/or shock absorbing support means.

The invention will be described in more detail hereinafter with reference to the accompanying drawings which are given solely by way of example and in which:

FIG. 2 is a partial sectional view of the mounting of this unit under the frame of the vehicle;

FIG. 3 is a longitudinal sectional view taken on line 3—3 of FIG. 4;

FIG. 4 is a view partly in plan and partly in section taken along the line 4—4 of FIG. 3;

FIG. 5 is a sectional view taken on line 5—5 of FIG. 3;

FIG. 6 is a view in the direction of arrow 6 of FIG. 3;

FIG. 8 is a partial sectional view of the pivotal mounting of the stand of the vehicle.

Figure 1:
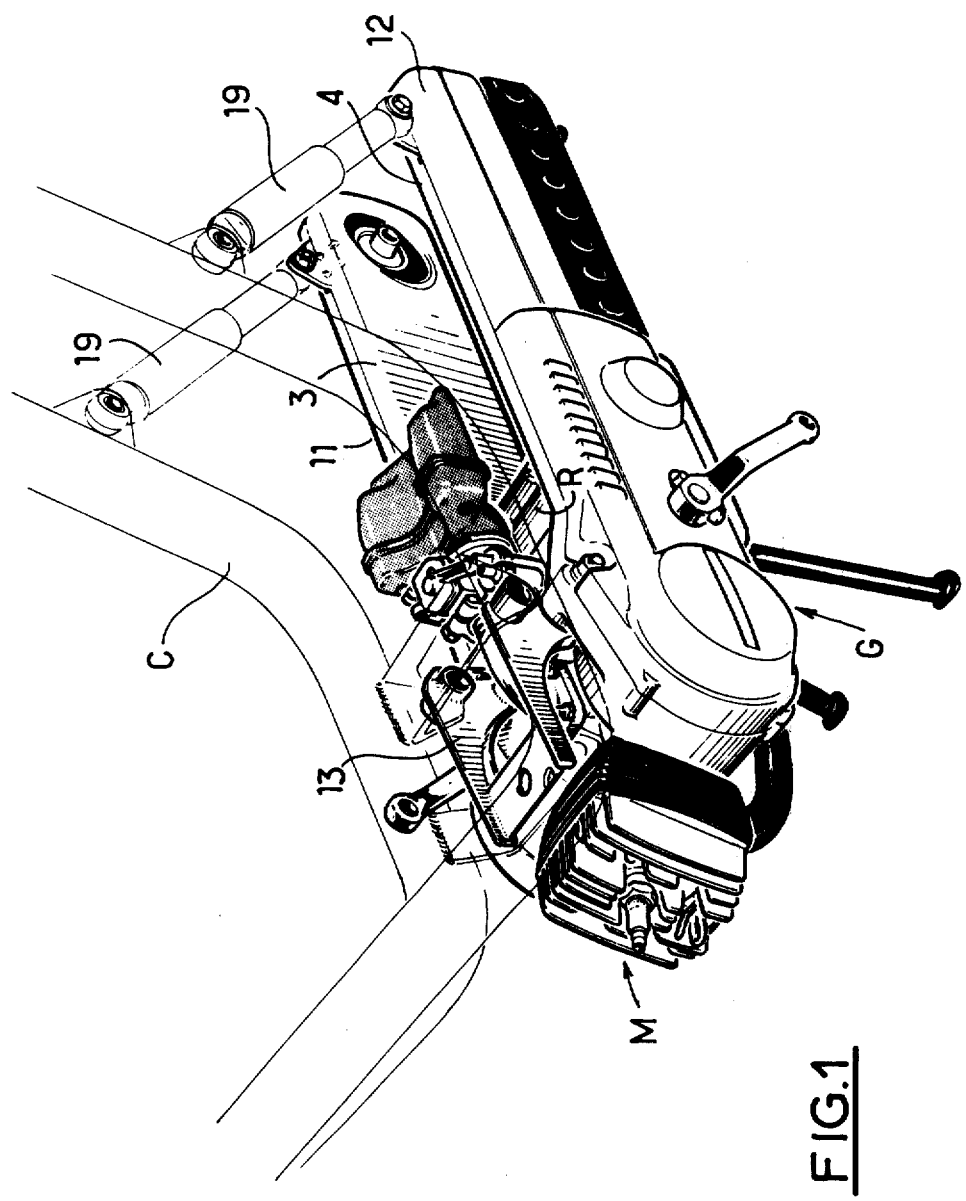
FIG. 1 is a perspective view of the drive unit according to the invention mounted on a vehicle frame shown diagrammatically.

FIG. 1 is an assembly view of a drive unit G according to the invention in its relationship to a tubular frame which is shown diagrammatically and designated by the reference C. This drive unit comprises in the front part thereof a motor M of conventional design which has not been described in detail. Immediately behind the motor, there is disposed a gearing down or speed reducing relay R and it will be seen that each of the two half-cases 1, 2 receiving these two sub-assemblies is made in a single piece. Detachably fixed to these half-cases are two longitudinal arms 3, 4 which extend rearwardly and are made from metal. These two arms have a U-shaped section in a vertical transverse plane, the opening of the U facing outwardly (FIGS. 5 and 6).

The case of the motor-relay unit defines, on each side of the motor and on one side of the relay 5, 6, cavities in which are disposed, on one hand, a magnetic flywheel 7 and, on the other hand, the transmission including pulleys 8, 9 and a belt 10. This assembly comprising the case and the suspension arms is completed by lateral covers 11 and 12 which may of course be made in one or more parts.

The mounting of the drive unit under the frame of the vehicle comprises a support 13 connected to the frame by two elastically yieldable articulations 14, 15 of the "silentblock" or like type, having an axis extending transversely of the median longitudinal plane of the vehicle. The motor unit is connected to this support by two elastically yieldable articulations 16, 17 and a pin 18.

The two suspension arms 3 and 4 comprise at the free ends thereof means for receiving the rear wheel of the vehicle and, in the vicinity of these rear ends, they are connected to the frame or to the suspended part of the vehicle by detachably fixed springs or shock absorbers 19.

The kinematic chain between the drive shaft 20 and the rear wheel will now be described in more detail.

This chain comprises the transmission including the pulleys 8 and 9 and the belt 10 and constituting a speed variator in the presently-described embodiment. The shaft 21 on which the driven pulley 8 is mounted constitutes the input shaft of the gearing down relay and this input shaft is placed as far away as possible from the output shaft of the motor so as to achieve a sufficiently great belt length. The relay further comprises an intermediate shaft 22 and an output shaft 23. A gearing down is achieved, between the input shaft and the intermediate shaft by a pair of gears 24, 25 and, between this intermediate shaft and the output shaft, by a second pair of gears 26, 27. The output shaft 23 drives the rear wheel through a conventional transmission comprising two sprockets 28, 29 and a roller chain 30.

Figure 7:
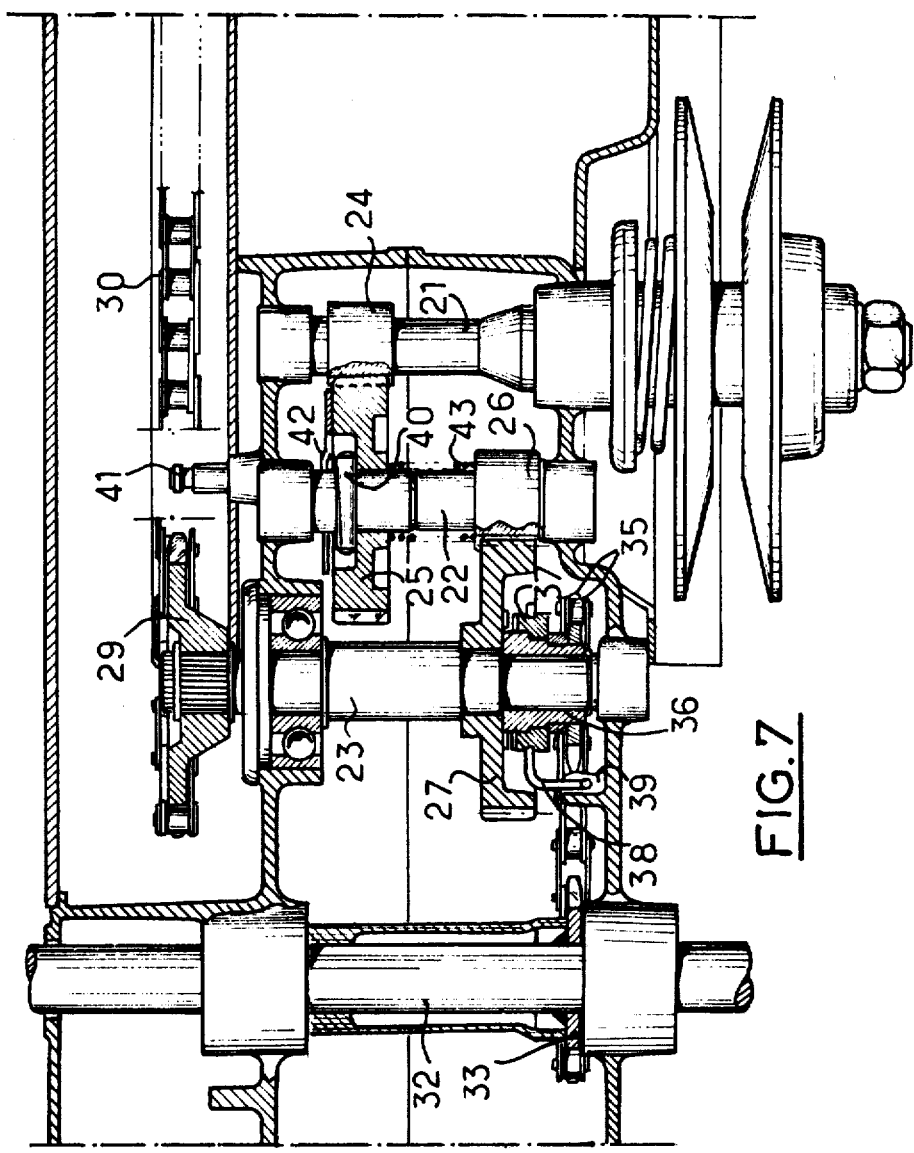
FIG. 7 is a view to an enlarged scale of the gearing down relay which is part of the unit according to the invention.

The output shaft 22 may be driven by a pedal crank gear 31 whose shaft 32 is journalled in the case of the motor and the relay and carries a sprocket 33 which drives through a chain 34 another sprocket 35 carried by a ring 36 which is rotatably mounted on the output shaft (FIG. 7).

A free wheel or unidirectional coupling mechanism is provided between the ring 36 and the gear 27 of the type comprising a ring 37 having lateral teeth which cooperate with complementary teeth carried by the adjacent face of the gear. This ring has inner helical ramps guided along complementary ramps formed on the ring 36 and it is slightly braked against rotation by a reaction member 38 which bears against an abutment 39 of the case.

Further, the gear 25 is connected to the intermediate shaft 22 to rotate with the latter by a pin 40 fixed in the shaft, the gear being slidably mounted on this shaft so as to be capable of uncoupling under the action of a thrust member 41 which acts on a fork member 42. The gear is then shifted in opposition to the action of a return spring 43.

It will be observed in FIG. 3 that the transverse vertical plane containing the axis of the pivotal mounting of the drive unit on the frame (axis of the pin 18) is located between the two parallel planes respectively containing the axis of the crankshaft 20 of the motor and the axis of the crank gear 32. This arrangement is particularly advantageous and renders the movements of the crank gear practically imperceptible.

FIGS. 3 and 8 illustrate the preferred manner of fixing the vehicle stand 50. The latter is pivotally mounted by a pin 51 between two bosses 52, 53 which are moulded on one of the two half-cases in the region of the gearing down relay. The case defines a support abutment 54 for the stand in the operative position of the latter.

It is unnecessary to describe in detail the operation of such a drive unit since the functions are clear from the foregoing description. Further, the advantages of this arrangement are the following:

Apart from the fact that the provision of a drive unit including the suspension arms facilitates manufacture and assembly since this unit may be manufactured separately and mounted as a single unit on the vehicle, which simplifies the operations for dismantling the assembly the presence of the detachable suspension arms enables the drive unit to be adapted to vehicles of different types by merely changing the arms and in particular by the use of suspension arms of different lengths;

as the wheel is mounted at the end of the suspension arms, and independently of the gearing down relay, the various shafts of the motor and of the transmission elements remain in relatively fixed positions so that it is possible to avoid variations in the running speed of the motor which otherwise result in additional fatigue of the transmission;

the mounting and dismantling of the rear wheel are considerably simplified;

the relative position of the axes of the pivotal mounting of the unit on the frame, of the crankshaft and of the crank gear is most advantageous, as mentioned before; and the very rearward position of the axis of the driven pulley in the gearing down relay enables a sufficiently great length to be retained for the belt which reduces wear of the latter.

Having now described my invention what I claim as new and desire to secure by Letters Patent is:

1. A drive out for a two-wheeled motor-driven vehicle comprising an assembly comprising a motor and a gearing down relay, suspension arms connected to the motor and adapted to receive, in the vicinity of free ends of the arms, a driving wheel of the vehicle, support means for a suspended part of the vehicle, the motor having a crankshaft, the relay having an output shaft and an input shaft, the input shaft being drivingly connected to the crankshaft of the motor and being spaced further away from the crankshaft than the output shaft of the relay, a pedal crank gear having a shaft which is located in said assembly between the motor and the relay and a unidirectional coupling drivingly coupling the crank gear shaft to the output shaft.

2. A drive unit according to claim 1, wherein said unidirectional coupling is a free-wheel device.

3. A drive unit according to claim 1, wherein said assembly has a case and the suspension arms are detachably fixed to said case.

4. A drive unit according to claim 1, wherein the gearing down relay comprises, between the input shaft and the output shaft, an intermediate shaft, a gearing down stage being provided respectively between the input shaft and the intermediate shaft and between the intermediate shaft and the output shaft.

5. A drive unit according to claim 1, 2, 3 or 4, wherein said assembly has a case which comprises two bosses which are an integral part of the case and between which bosses a stand is pivotally mounted.

6. A drive unit according to claim 5, wherein the case defines a support abutment for the stand.

7. A drive unit according to claim 5, wherein said assembly comprises pivotal means for mounting said assembly on a frame of said vehicle, and a vertical transverse plane containing a pivot axis of said pivotal means is located between the two parallel planes respectively containing the axis of the crankshaft of the motor and the axis of the crank gear.

8. A two-wheeled motor-driven vehicle comprising a drive unit, said unit comprising an assembly comprising a motor and a gearing down relay, suspension arms connected to the motor and receiving, in the vicinity of free ends of the arms, a driving wheel of the vehicle, support means for a suspended part of the vehicle, the motor having a crankshaft, the relay having an output shaft and an input shaft, the input shaft being drivingly connected to the crankshaft of the motor and being spaced further away from the crankshaft than the output shaft of the relay, a pedal crank gear having a shaft which is located in said assembly between the motor and the relay and a unidirectional coupling drivingly coupling the crank gear shaft to the output shaft, said unit being mounted on the vehicle to pivot about a transverse axis under the suspended part of the vehicle and being connected, at the rear part thereof, to the support means for said suspended part.

* * * * *